United States Patent
Daniels (10) Patent No.: US 12,423,988 B1
(45) Date of Patent: Sep. 23, 2025

(54) METHODOLOGY OF BUILDING A MULTI TASK MODEL INTO A SINGLE MODEL

(71) Applicant: Lytx, Inc., San Diego, CA (US)

(72) Inventor: Jesse Daniels, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 297 days.

(21) Appl. No.: 17/696,471

(22) Filed: Mar. 16, 2022

(51) Int. Cl.
| | |
|---|---|
| *G06V 20/58* | (2022.01) |
| *B60W 50/10* | (2012.01) |
| *G06N 20/00* | (2019.01) |
| *G06V 20/56* | (2022.01) |

(52) U.S. Cl.
CPC ............ *G06V 20/58* (2022.01); *B60W 50/10* (2013.01); *G06N 20/00* (2019.01); *G06V 20/588* (2022.01); *B60W 2420/403* (2013.01); *B60W 2554/4041* (2020.02); *B60W 2554/4045* (2020.02); *B60W 2554/4049* (2020.02)

(58) Field of Classification Search
CPC ..... G06V 20/58; G06V 20/588; B60W 50/10; B60W 2420/403; B60W 2554/4041; B60W 2554/4045; B60W 2554/4049; G06N 20/00

USPC .......................................................... 382/104
See application file for complete search history.

(56) References Cited

U.S. PATENT DOCUMENTS

| | | | |
|---|---|---|---|
| 2018/0018524 A1* | 1/2018 | Yao .................... | G06V 20/56 |
| 2018/0155058 A1* | 6/2018 | Fenton ................. | B64C 39/024 |
| 2019/0213873 A1* | 7/2019 | Adireddy ............. | G08G 1/0116 |
| 2020/0110416 A1* | 4/2020 | Hong ................... | G05D 1/0088 |
| 2020/0193206 A1* | 6/2020 | Turkelson ............. | G06V 20/70 |
| 2021/0056363 A1* | 2/2021 | Song ..................... | G06T 7/10 |
| 2023/0097121 A1* | 3/2023 | Schwartz ........... | G05B 13/0265 |
| | | | 701/26 |

* cited by examiner

*Primary Examiner* — Stephen P Coleman
(74) *Attorney, Agent, or Firm* — Van Pelt, Yi & James LLP (57) ABSTRACT

The system includes a processor and a memory. The processor is configured to receive data from a camera, determine a plurality of heat maps using a multitask model, and provide the plurality of heat maps. The memory is coupled to the processor and configured to provide the processor with instructions.

21 Claims, 10 Drawing Sheets

Augmentation matrix

| | Object | Lane | Horizon | ... | $Task_m$ |
|---|---|---|---|---|---|
| Contrast | 1 | 0 | 1 | ... | $a_{1m}$ |
| Padding | 1 | 0 | 0 | ... | $a_{2m}$ |
| Scale | 0 | 1 | 0 | ⋱ | ⋮ |
| Rotate | 0 | 1 | 1 | ⋱ | ⋮ |
| Crop | 1 | 1 | 0 | ⋱ | ⋮ |
| Shift | 0 | 0 | 1 | ⋱ | ⋮ |
| Horizonal Flip | 1 | 1 | 0 | ⋱ | ⋮ |
| Vertical Flip | 0 | 0 | 0 | ⋱ | ⋮ |
| Cutout | 0 | 1 | 1 | ⋱ | ⋮ |
| Brightness | 1 | 0 | 1 | ⋱ | ⋮ |
| Saturation | 0 | 0 | 1 | ⋱ | ⋮ |
| Hue | 0 | 0 | 1 | ⋱ | ⋮ |
| Greyscale | 0 | 0 | 1 | ⋱ | ⋮ |
| $Augmentation_n$ | $a_{n1}$ | $a_{n2}$ | $a_{n3}$ | ... | $a_{nm}$ |

FIG. 10

METHODOLOGY OF BUILDING A MULTI TASK MODEL INTO A SINGLE MODEL

BACKGROUND OF THE INVENTION

Modern transportation vehicles often include a vehicle event recorder in order to support driver safety, operational safety, and operational productivity. A vehicle event recorder typically includes a set of sensors (e.g., cameras, video recorders, audio recorders, accelerometers, gyroscopes, vehicle state sensors, global positioning system sensors, etc.) that report data that can be analyzed to determine the occurrence of incidents such as high-risk events, process inefficiencies, driver compliance, or anomalous events (e.g., distractions, hard braking, lane change, pedestrians, rain, accidents, risky maneuvers, unexpected locations, proximity risks, vehicle malfunctions, improper driver behavior, etc.). Real-time analysis of image sensor data (e.g., detection of objects, lanes, horizons, etc.) is critical for generating timely driver alerts in response to high-risk events (e.g., closing in on an object too quickly, not leaving enough room in front of the vehicle for driving conditions, crossing a lane without turn signal indication, how well lane boundaries are being maintained, whether the vehicle came to a complete stop at a stop sign, etc.). Typically, multiple machine learning models are required to detect the plurality of image features of interest (e.g., one for each of object detection, lane detection, horizon detection, etc.) in order to identify such high-risk events. This presents a problem because an embedded vehicle event recorder has limited compute and memory and is unable to run many models concurrently or provide real-time results for those models.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for building a multitask model into a single model comprising a processor and a memory is disclosed. The processor for building a multitask model is configured to receive data from a camera and determine a plurality of heat maps using a multitask model. The memory for building a multitask model into a single model is coupled to the processor and configured to provide the processor with instructions.

In some embodiments, the camera comprises a vehicle event recorder camera or a vehicle camera. For example, a vehicle event recorder (VER) typically includes a set of sensors (e.g., cameras, video recorders, audio recorders, accelerometers, gyroscopes, vehicle state sensors, global positioning system sensors, etc.) that report data that can be analyzed to determine the occurrence of incidents such as high-risk events, process inefficiencies, driver compliance, or anomalous events. Real-time analysis of image sensor data (e.g., detection of objects, lanes, horizons, etc.) is critical for generating timely driver alerts in response to high-risk events (e.g., closing in on an object too quickly, not leaving enough room in front of the vehicle for driving conditions, crossing a lane without turn signal indication, how well lane boundaries are being maintained, whether the vehicle came to a complete stop at a stop sign, etc.). Typically, multiple machine learning models are required to detect the plurality of image features of interest (e.g., one for each of object detection, lane detection, horizon detection, etc.) in order to identify such high-risk events. This presents a problem because an embedded vehicle event recorder has limited compute and memory and is unable to run many models concurrently or provide real-time results for those models. In some embodiments, the data from the camera comprises video data. In some embodiments, the data from the camera comprises image data.

In some embodiments, the system provides an efficient model to perform multiple tasks. The multitask model takes as input camera data (e.g., vehicle camera data—for example, from a vehicle event recorder camera), where the input camera data comprises image data and/or video data. In some embodiments, data from the camera is encoded by down sampling into an encoded tensor, and wherein the encoded tensor is decoded by up sampling into a decoded tensor.

In some embodiments, the multitask model determines a number of output object heat maps related to the multiple tasks. For example, the multiple task model determines an object heat map. In various embodiments, the object heat map comprises one or more of: a vehicle object heat map, a pedestrian object heat map, a traffic light object heat map, a cyclist object heat map, a stop sign object heat map, an x object scale, a y object scale, an x object offset, a y object offset, and/or any other appropriate object heat map. In some embodiments, the object heat map is post processed to generate an object location and an object box. In some embodiments, the heatmap is decoded to generate one or more object locations and associated box coordinates.

In some embodiments, the multitask model determines a horizon heat map. In some embodiments, the horizon heat map comprising horizon pixels. In various embodiments, the horizon heat map is post processed by one or more of thresholding, determining a number of highest value points, fitting a line through a number of points, determining an angle of a horizon line as a horizon annotation, determining an offset location of a horizon line as a horizon annotation, and/or any other appropriate horizon heat map.

In some embodiments, the multitask model determines a lane heat map. In some embodiments, the lane heat map comprises one or more of: a lane location heat map, one or two vertical affinity fields for lanes, and/or a horizontal affinity field for lanes. In various embodiments, the lane heat map is post processed by one or more of thresholding the lane heat map to determine lane areas, determining a vector field as a lane annotation, determining a change in vector field direction, determining a vertical or a near vertical vector associated with a location in the lane heat map to cluster the lanes areas, determining a change in an image row of a vector field direction to identify a lane edge point, fitting a cubic spline to sets of lane edge points as a lane annotation, and/or any other appropriate lane heat map.

In some embodiments, multitask model is trained using preprocessed data. In various embodiments, the preprocessed data includes horizontal flipping of data, cropping of data, changing contrast of data, changing brightness of data, changing saturation of data, changing hue of data, resizing of image data, cutting out image data, shifting image data vertically, and/or shifting image data horizontally. In some embodiments, the preprocessed data is related to one task and one heat map output.

In some embodiments, an other processor is used for performing post processing of the plurality of heat maps.

Figure 1:
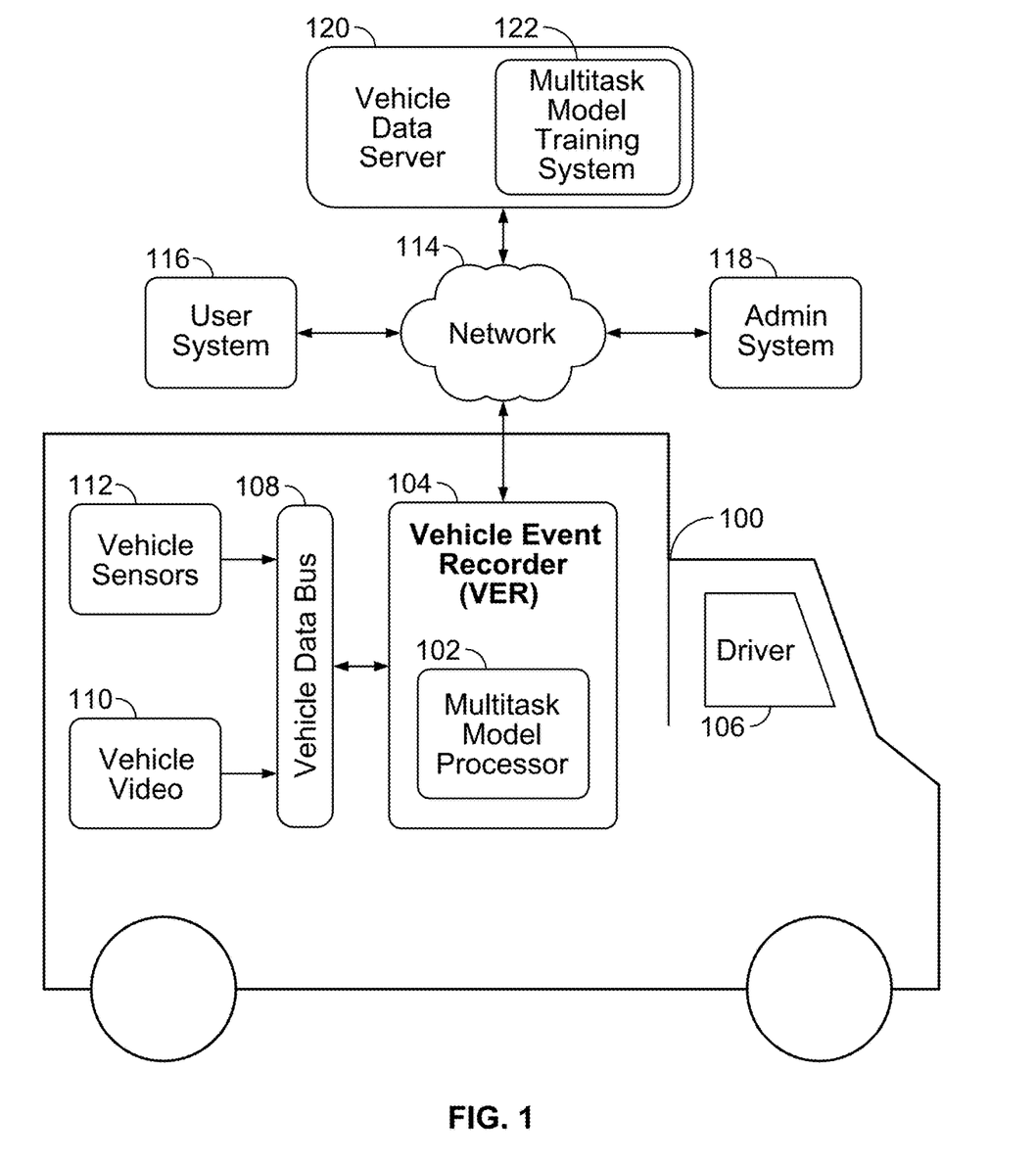
FIG. 1 is a block diagram illustrating an embodiment of a system for building a multitask model into a single model.

FIG. 1 is a block diagram illustrating an embodiment of a system for building a multitask model into a single model. In the example shown, vehicle 100 comprises vehicle event recorder 104, multitask model processor 102, vehicle data bus 108, vehicle video 110, vehicle sensors 112, and driver 106. Vehicle event recorder 104 communicates to user system 116, vehicle data server 122, and admin system 118 via network 114. Vehicle data server 120 comprises multitask model training system 122.

Vehicle event recorder 104 receives real-time data from sensors on vehicle event recorder 104 and from vehicle video 110 and vehicle sensors 112 via vehicle data bus 108. In various embodiments, multitask model processor 102 generates information regarding objects, the horizon, lanes, and/or any other appropriate information. In some embodiments, vehicle event recorder 104 processes the real-time data with multitask model processor 102 to generate automated driver assistance alerts for driver 106 and video annotations that are transmitted via network 114 to vehicle data server 120.

Admin system 118 administers instructions to multitask training system 122 via network 114 in order to generate a multitask model for use in multitask model processor 102. Multitask training system 122 receives training images and labels from vehicle data server 122 and outputs a multitask model update to multitask model processor 102 via network 114. User system 116 queries vehicle data server 122 to view vehicle video annotated by multitask model processor 102 via network 114.

In some embodiments, the system for multitask models (e.g., model training and model processor) makes a computer better by enabling multiple tasks to be performed efficiently using limited processing resources. For example, by using a common input form (e.g., camera data) and a common output form (e.g., heat maps), the model processor is able to generate multiple types of output using a single model saving on memory and processor resources. In some embodiments, the multiple types of output are produced in near parallel and near real-time.

In some embodiments, multitask model training system 122 is part of a separate server instead of online vehicle data server 122. In some embodiments, multitask model training system 122 trains the model offline. Once the multitask model is trained offline using historical, data captured from the device and stored in a data repository, the model is converted to a form suitable for deployment on the embedded processor of vehicle event recorder 104. This conversion process includes quantizing the weights and converting the multitask model to a format that is compatible with the model runtime in the device processor. The model is then deployed by transferring the model to vehicle event recorder 104. The deployed model is run in inference mode vs. training mode. In inference mode, no modifications to the model's weights are made (as they are in training), instead the model is strictly run against the video frames to produce heatmap outputs.

Figure 2:
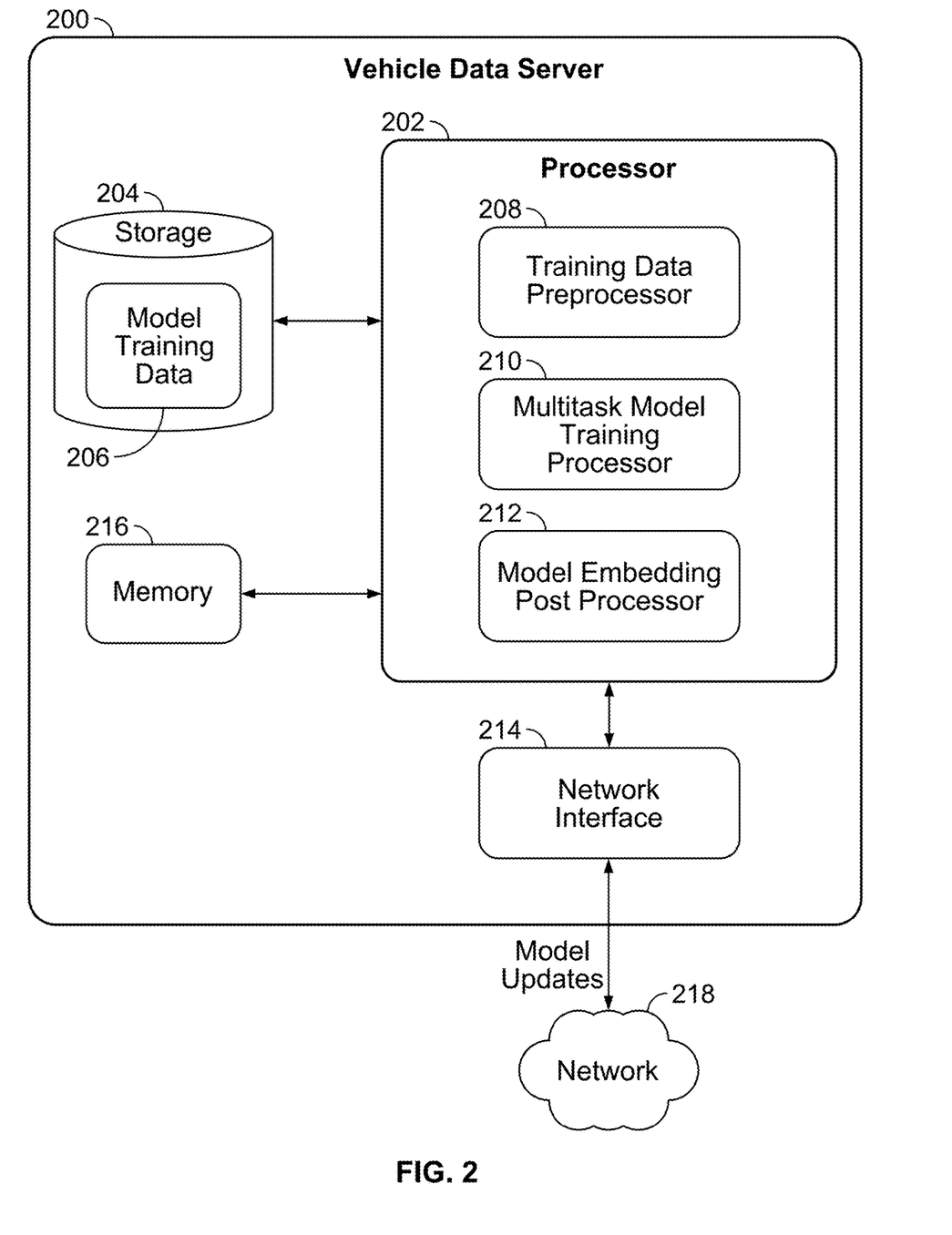
FIG. 2 is a block diagram illustrating an embodiment of a vehicle data server.

FIG. 2 is a block diagram illustrating an embodiment of a vehicle data server. In some embodiments, vehicle data server 200 of FIG. 2 is used to implement vehicle data server 120 of FIG. 1. Vehicle data server 200 comprises processor 202, storage 204, memory 216, and network interface 214. Processor 202 further comprises training data preprocessor 208, multitask model training processor 210, and model embedding processor 212. Storage 204 further comprises model training data 206.

In the example shown, vehicle data server 200 provides model updates to multitask model processor via network 218. In some embodiments, multitask model processor is implemented by multitask model processor 102 of FIG. 1 and network 218 is implemented by network 114 of FIG. 1.

Processor 202 receives model training data 206 from storage 204. For example, model training data 206 comprises images of objects, lanes, and horizons and associated image labels for each image. In some embodiments, image labels contain information about the location of the features of interest in the image (e.g., object location, object class type, lane location, number of lanes, horizon location, etc.) as well as the training task type (e.g., object, lane, horizon, etc.).

In some embodiments, multitask model is trained using preprocessed data. In some embodiments, preprocessed data is related to one task and one heat map output. For example, training data preprocessor 208 augments task-specific model training data 206 and produces an image training pair (e.g., image and target heatmap training data pair) for training a multitask model in multitask model training processor 210. In some embodiments, the augmented training data is held in memory 216 before being processed by multitask model training processor 210. In various embodiments, preprocessed data includes horizontal flipping of data, cropping of data, changing contrast of data, changing brightness of data, changing saturation of data, changing hue of data, resizing of image data, cutting out image data, shifting image data vertically, shifting image data horizontally, and/or any other appropriate preprocessing.

Multitask model training processor 210 receives image training pairs (e.g., image and target heatmap training data pairs) for each task type (e.g., object, lane, horizon, etc.) and updates multitask model parameters conditioned on task type. In some embodiments, the training error signal is zeroed out for off-task target images and the task indicator associated with each training image tells the training algorithm what target outputs to mask out and to what data pair that the training belongs (e.g., image and target data pair). For example, during multitask model training for generating target heatmaps for objects and their locations, the training error signals associated with horizons and lanes are set to zero.

In some embodiments, training of the model is performed by a separate offline server not by vehicle data server 200.

Model embedding postprocessor 212 quantizes the multitask model that was trained using floating point arithmetic in multitask model training processor 210 in order to generate a multitask model that can be implemented using integer arithmetic by the multitask model processor in the vehicle. In some embodiments, the model quantization to integers is performed by reducing the dynamic range of the model parameters by shifting and clipping the parameter values. In some embodiments, quantization is applied to the model's input weights and the outputs, and all model arithmetic calculations are integer calculations.

Figure 3:
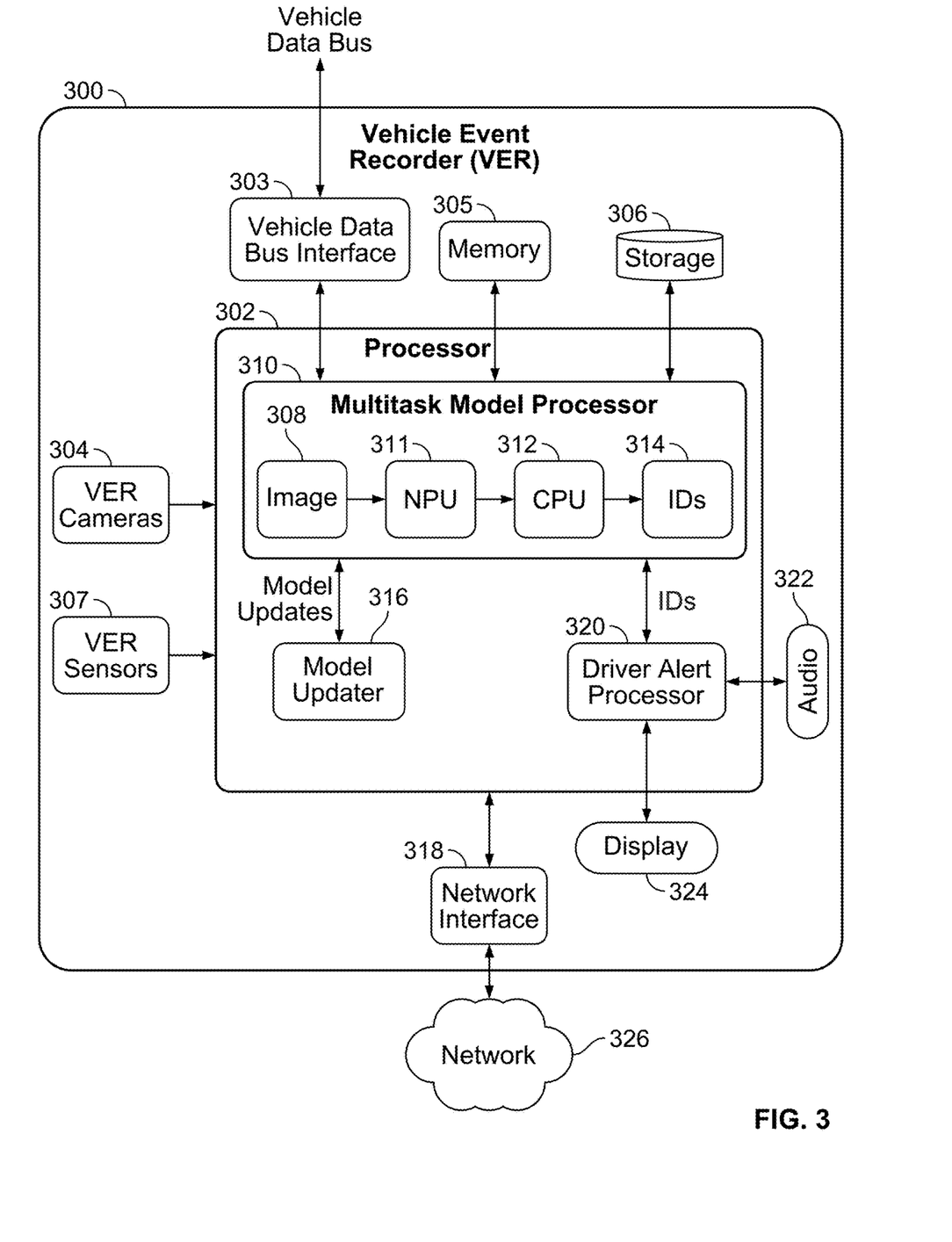
FIG. 3 is a block diagram illustrating an embodiment of a vehicle event recorder (VER).

FIG. 3 is a block diagram illustrating an embodiment of a vehicle event recorder (VER). In some embodiments, vehicle event recorder 300 of FIG. 3 is used to implement vehicle event recorder 104 of FIG. 1. In the example shown, vehicle event recorder 300 comprises processor 302, vehicle data bus interface 303, memory 305, storage 306, VER cameras 304, VER sensors 307, audio 322, display 324, and network interface 318. Processor 302 further comprises multitask processor 310, model updater 316, and driver alert processor 320. Multitask processor 310 further comprises input image interface 308, Neural processing unit (NPU) 311, Central processing unit (CPU) 312, and output identifications interface (IDs) 314.

In the example shown, multitask processor 310 receives images using input image interface 308 from VER cameras 304 and/or other vehicle cameras via vehicle data bus interface 303. NPU 311 processes the received images and generates heat maps indicating the probability of image feature types and locations (e.g., lane locations, number of lanes, horizon location, object types, object locations etc.). For example, NPU 311 produces a single heatmap for each object type (e.g., a heatmap for each of vehicles, pedestrians, traffic lights, cyclists, and stop signs). The object model also outputs an offset and scale annotation heatmap that is used to identify the precise location and size of potential object boxes at each pixel location. In some embodiments, lane heatmaps comprise 3 heatmaps: one heatmap indicating where the lanes exist in the image and two other heatmaps for vertical and horizontal "affinity fields" that are used to cluster the lane pixels to distinct lanes. In some embodiments, the horizon heatmap comprises a single heatmap indicating the location of horizon pixels.

In some embodiments, CPU 312 processes the probability heatmaps from NPU 311 and outputs the identifications and locations of features of interest in the image using IDs 314. For example, CPU 312 outputs heatmaps indicating where a high probability of a pedestrian in the image is and that the location of the pedestrian overlaps with the location of the current driving lane. CPU 312 post processes the NPU-generated heatmaps. For example, peaks in the object heatmaps are located to identify object centers, and the corresponding scale and offset values are extracted at those peak locations in the scale and offset heatmaps to further refine the location of each object and the object's box size. In various embodiments, CPU 312 outputs one or more of individual objects, lanes, horizons, or any other appropriate outputs.

In some embodiments, the offset heatmaps are used to adjust object center locations to account for the quantization effects of down sampling the original image (e.g., 256×512 image to 64×128 heatmap). Because the 64×128 heatmaps have coarser spatial dimensions than the input 256×512 image, the offsets are calculated to further refine the location in 64×128 dimensions so they are more accurate at more fine-grained spatial dimensions. The multitask model learns to accurately predict these offset values based on training data where the location of each object is indicated in the coarse-grained 64×128 spatial feature space along with the appropriate offset to get the sub-pixel locations that are accurate at finer-grained spatial dimensions. To generate the training data for calculating offsets, the object center locations in the original image pixel space (e.g., 960×1920) is quantized to a coarse-grained 64×128 heatmap grid, and the x and y error in location is calculated due to snapping the locations to the coarse grained heatmap grid. The sub-pixel error values are the target predictions for the multitask model. This provides CPU 312 the necessary information for adjusting the predicted object center locations to be correct at higher resolution. In some embodiments, the scale map contains the x and y scale values at each pixel location in the 64×128 scale heatmap. Similarly, a threshold is applied to the lane heatmap intensity to segment out regions of likely lane locations The likely lane locations are used to identify pixel regions where lanes exist. Further, the horizontal and vertical affinity field values are used at those thresholded lane pixel locations to cluster lanes together into individual entities. Horizon heatmaps are post-processed by extracting the top most confident points in the heatmap, and these top most confident points are then fit with a straight line to determine a horizon line.

Driver alert processor 320 communicates with the driver via audio 322 and display 324. For example, multitask processor 310 identifies that the vehicle is not centered in a determined lane and that there is a pedestrian in the field of view. Driver alert processor 320 receives the image identifications (e.g., identifications provided by output interface IDs 314) and data from VER sensors 307. Driver alert processor 320 sends the driver a warning message via audio 312 and/or display 316. For example, the warning message may indicate that the vehicle is drifting from the current lane, the vehicle speed is high, there is a pedestrian ahead, and/or any other appropriate warning message. In various embodiments, the driver is alerted with a collision warning (e.g., closing in on an object too quickly), a headway warning (e.g., tailgating, not leaving enough room in front of the vehicle during driving conditions), lane departure warning (e.g., crossing a lane without indicating with turn signal), fitness to lane warning (e.g., how well vehicle keeps within the lane), a rolling stop warning (e.g., vehicle did not come to a complete stop when stop sign applicable to vehicle is present), and/or any other appropriate warning.

Multitask processor 310 updates its data models via model updater 316. For example, multitask model training system 122 of FIG. 1 trains a new model that adds the ability to detect a new object (e.g., stop sign, billboard, traffic cone, etc.) and admin system 118 of FIG. 1 instructs vehicle data server 120 of FIG. 1 to deploy the new model to the vehicle. Vehicle data server 120 sends the new model to the vehicle's model updater 316 via network 326 and model updater 316 updates the multitask model in multitask model processor 310.

In some embodiments, multitask processor 310 sends and receives data from storage 306. For example, when network 326 is unavailable, multitask processor 310 stores identification stream 314 until network 326 is available. In some embodiments, multitask processor 310 sends and receives data from memory 305 during processing for temporary storage.

Figure 4:
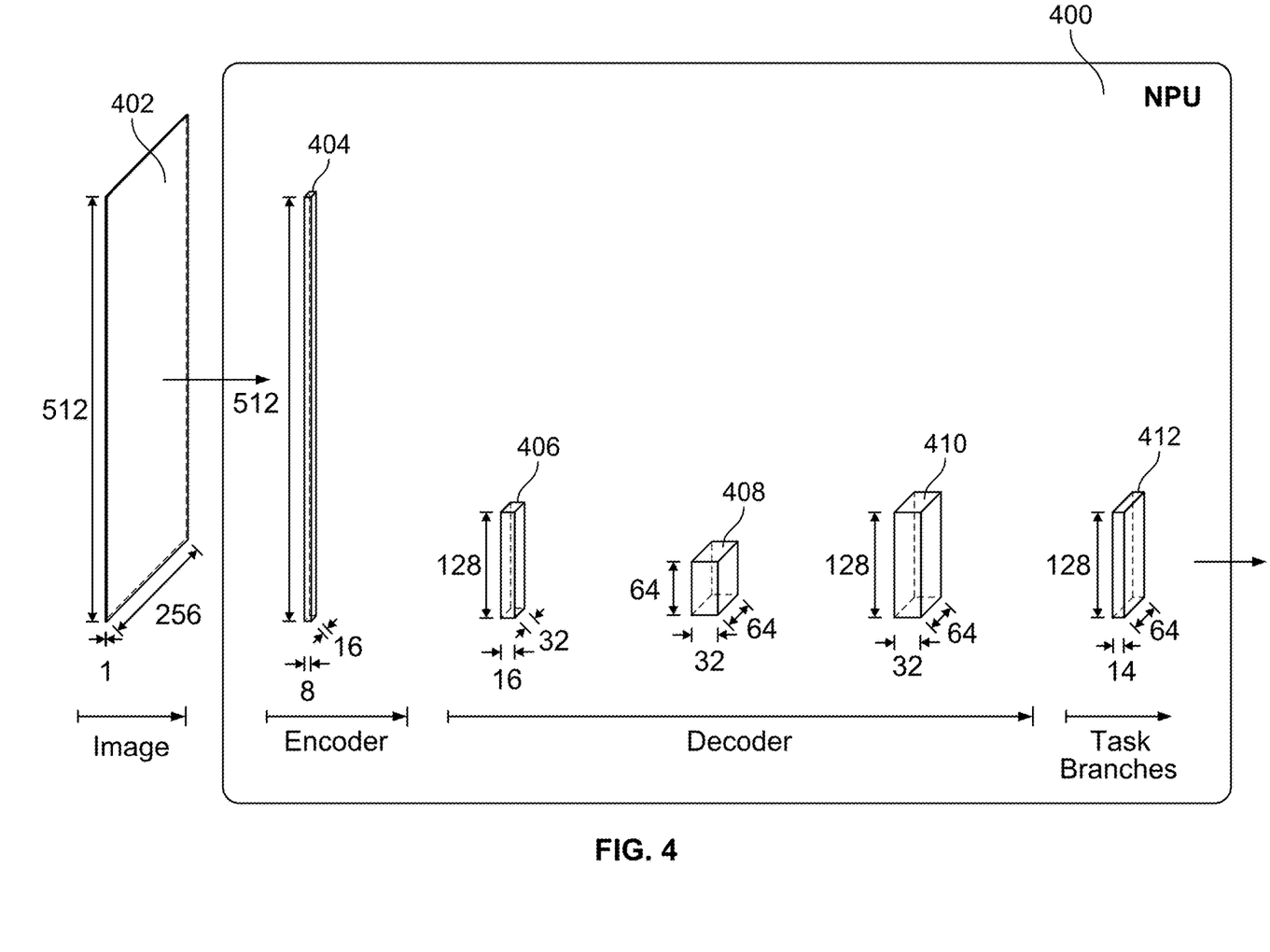
FIG. 4 is an illustration of the stages of neural network tensor size in an embodiment of a multitask model implemented by a neural processing unit (NPU).

FIG. 4 is an illustration of the stages of neural network tensor size in an embodiment of a multitask model implemented by a neural processing unit (NPU). In some embodiments, NPU 400 of FIG. 4 is used to implement NPU 311 of FIG. 3. In the example shown, NPU 400 indicates tensor sizes used for calculation during encoder stage 404, decoder stages 406, 408, and 410, and task branches 412. In some embodiments, NPU 400 receives input image 402 for processing.

In some embodiments, the encoder stage of the NPU processing is performed using a convolutional neural network (CNN) that receives a 256×512 input image and outputs an 8×16×512 encoded tensor of features. In some embodiments, decoder stages of the NPU processing use a series of transposed convolutional layers to up-sample and generate an output feature map that has a spatial dimension greater than that of the input feature map (e.g., an output feature map with dimensions 64×128×32 vs. the input feature map with dimensions 8×16×512).

In some embodiments, during the task branch stage the NPU receives the output from the decoder stage and produces task-specific output heatmaps (e.g., object task heatmaps, lane task heat maps, and horizon task heatmaps). For example, the output heatmap tensor includes object task heatmaps with dimensions 64×128×9 that include a total of 9 heatmaps comprising 5 heatmaps of object centers, 2 heatmaps of scales, and 2 heatmaps of offsets. The output heatmap tensor includes lane heatmaps with dimensions 64×128×4 that include a total of 4 heatmaps comprising 1 heatmap of lane centers, 1 heatmap of horizonal affinity, and 2 heatmap of vertical affinity. The output heatmap tensor includes a horizon heatmap with dimensions 64×128×1 comprising horizon centers.

Figure 5:
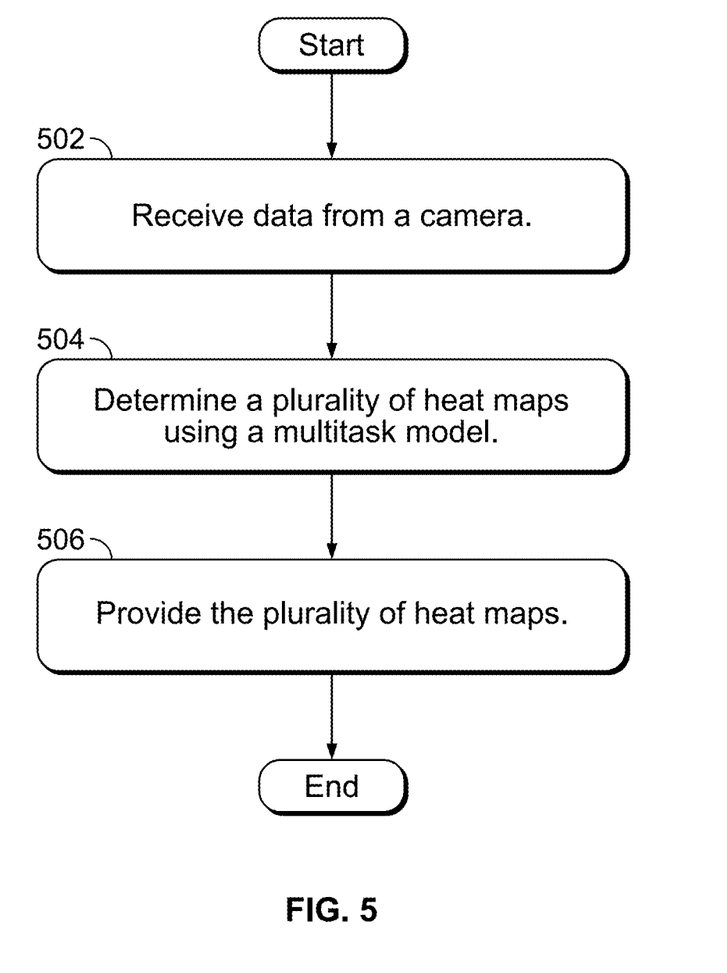
FIG. 5 is a flow diagram illustrating an embodiment of a system for building a multitask model into a single model.

FIG. 5 is a flow diagram illustrating an embodiment of a system for building a multitask model into a single model. In some embodiments, the process of FIG. 5 is executed by the system for building a multitask model into a single model of FIG. 1. In the example shown in 502, data is received from a camera. For example, camera data is received from a camera at a processor, where the camera data comprises interior camera video data, exterior camera video data, and/or any other appropriate sensor data.

In 504, a plurality of heat maps using a multitask model is determined. In some embodiments, multitask model is implemented by multitask model processor 310 of FIG. 3. For example, multitask model processor receives video and sensor data and outputs a plurality of heat maps that indicate the presence of features of interest and their locations in the image. In some embodiments, the heatmaps comprise heatmaps of object centers, object scales, object offsets, lane centers, lane affinity, and horizon centers. This makes processing more efficient as the single multitask model is able to execute on a device processor (e.g., a vehicle event recorder) as opposed to running multiple models on the device processor. In some cases, the device processor is not able to run multiple models and is able to run the single multitask model.

In 506, the plurality of heat maps is provided. In some embodiments, the plurality of heat maps is provided by NPU 311 of FIG. 3. In some embodiments, the plurality of heatmaps is processed to determine driver assistance alerts.

Figure 6:
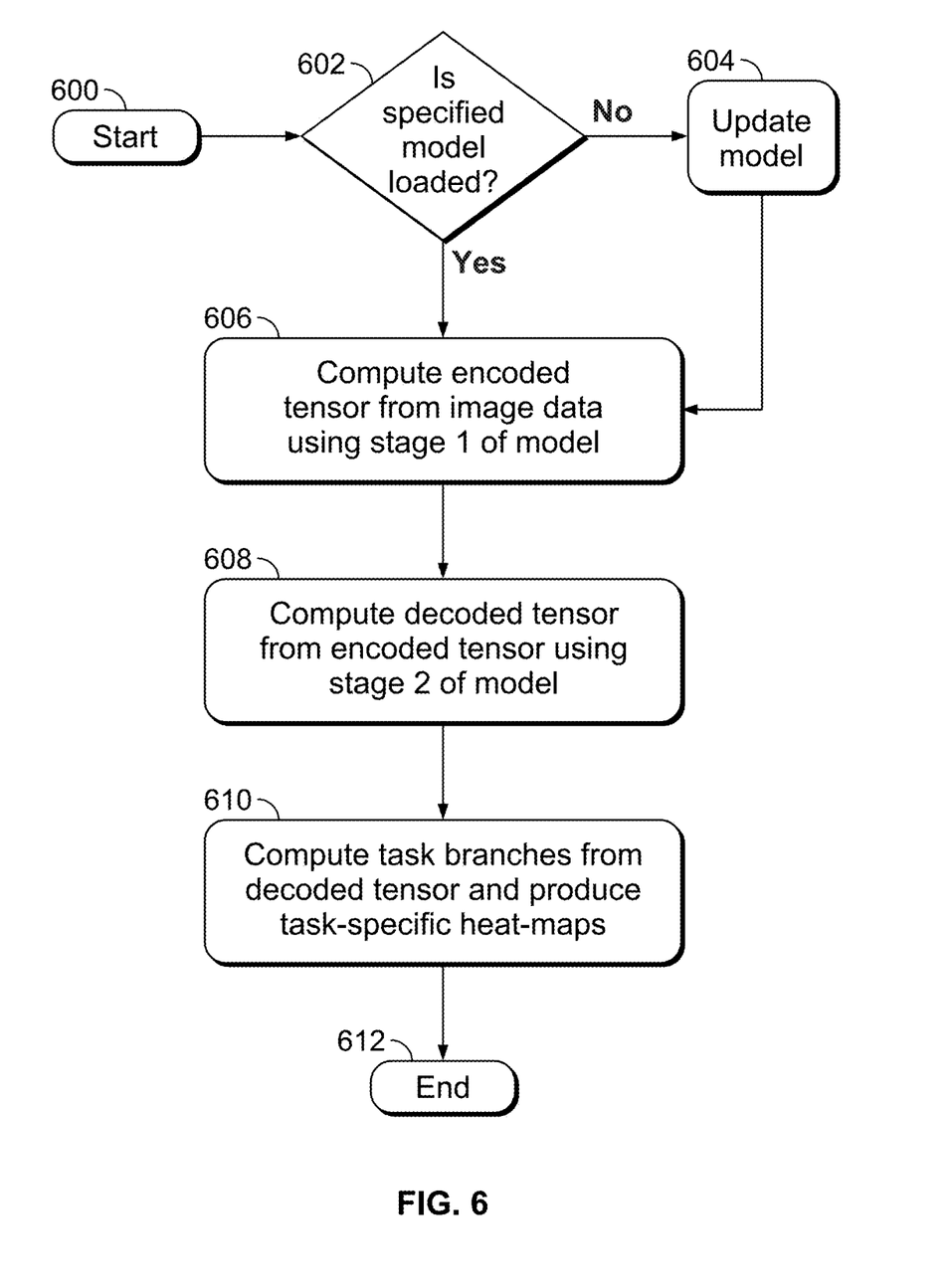
FIG. 6 is a flow diagram illustrating an embodiment of a method to determine a plurality of heat maps using a multitask model.

FIG. 6 is a flow diagram illustrating an embodiment of a method to determine a plurality of heat maps using a multitask model. In some embodiments, the flow diagram of FIG. 6 implements 504 of FIG. 5. In the example shown, in 602 it is determined whether the specified model is loaded. If the model is loaded, control passes to 606. If the model is not loaded, control passes to 604. In 604, the model is updated and control passes to 606. In 606, an encoded tensor is computed from image data using stage 1 of the model and control is passed to 608. For example, the image data is encoded as an 8×16×512 tensor of features using a convolutional neural network (e.g., using convolutional neural network ResNet18). In 608, a decoded tensor is computed from encoded tensor using stage 2 of model and control is passed to 610. For example, the decoder stage of the model uses a series of transposed convolutional layers to up-sample and generate an output feature map that has a spatial dimension greater than that of the input encoded feature map (e.g., an output feature map of 64×128×32 vs. the input feature map of 8×16×512). In 610, task branches are computed from the decoded tensor, and task-specific heat-maps are produced, and the process ends. For example, task branches receive output from the decoder stage and produce task-specific output heatmaps (e.g., object task heatmaps, lane task heat maps, and horizon task heatmaps).

Figure 7:
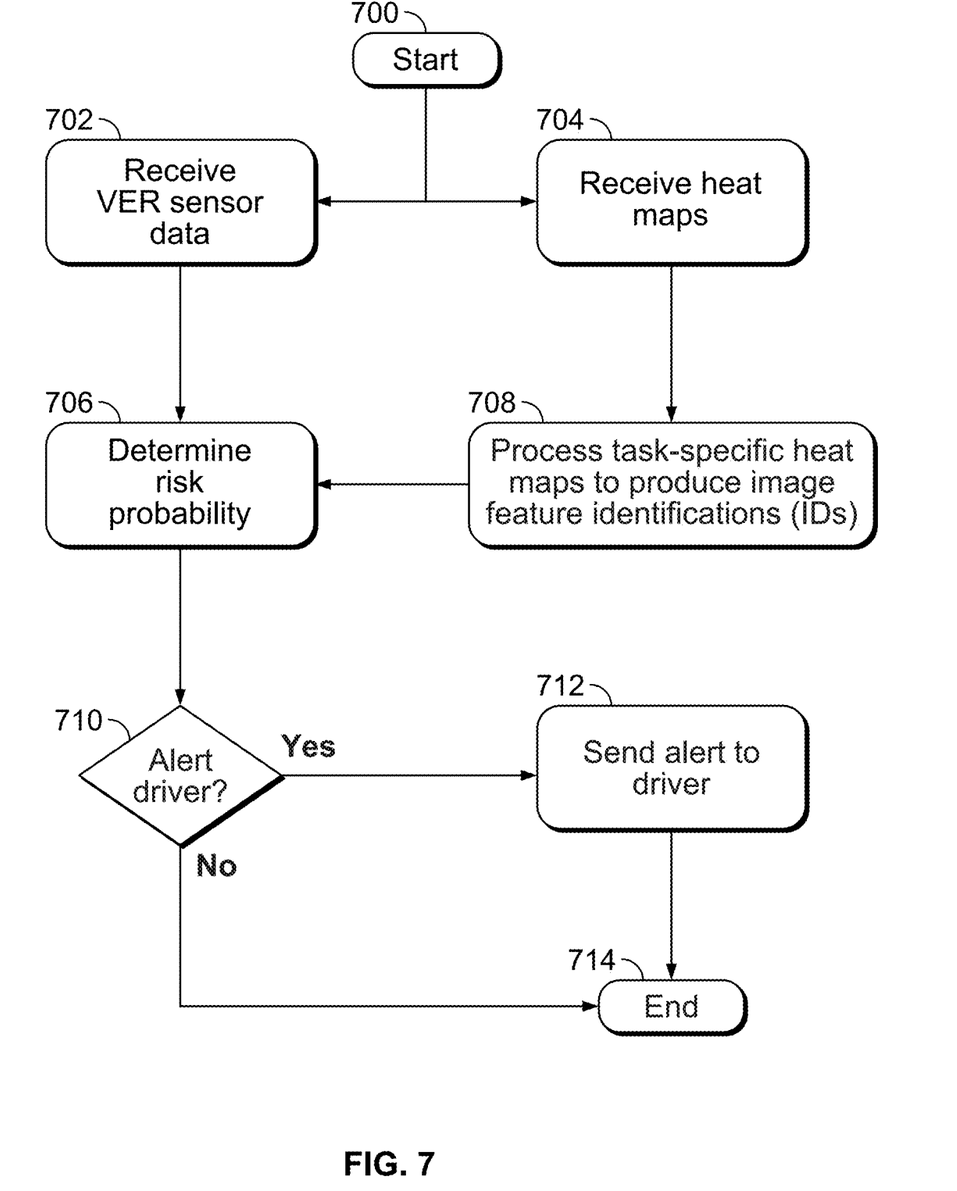
FIG. 7 is a flow diagram illustrating an embodiment of a system for processing heat maps.

FIG. 7 is a flow diagram illustrating an embodiment of a system for processing heat maps. In some embodiments, the flow diagram of FIG. 7 is implemented by processor 302 of FIG. 3. In the example shown, in 704, heat maps are received and control passes to 708. In 708, task-specific heat maps are processed to produce image feature identifications (IDs) and control passes to 706. In some embodiments, task-specific heat maps are received from neural processing unit 311 of FIG. 3 and processed by central processing unit (312) to produce image feature identifications (IDs) 314. In 702, additional VER sensor data is received and control passes to 706. For example, sensor data (e.g., cameras, video recorders, audio recorders, accelerometers, gyroscopes, vehicle state sensors, global positioning system sensors, etc.) is received and analyzed to determine the occurrence of incidents such as high-risk events, process inefficiencies, driver compliance, or anomalous events. In 706, the probability of risk is determined and control passes to 710. For example, the probability of risk is determined to be high because feature identifications (IDs) indicate the presence of a stop sign and a pedestrian and the VER sensor data indicate that the vehicle is moving at a high rate of speed. In 710, whether to alert the driver is determined. If an alert is not determined, the process ends. If a driver alert is determined, control passes to 712. In 712, an alert is sent to the driver and the process ends. For example, the probability of risk is determined to be high for running a stop sign and the driver is sent an alert to slow the vehicle down.

Figure 8:
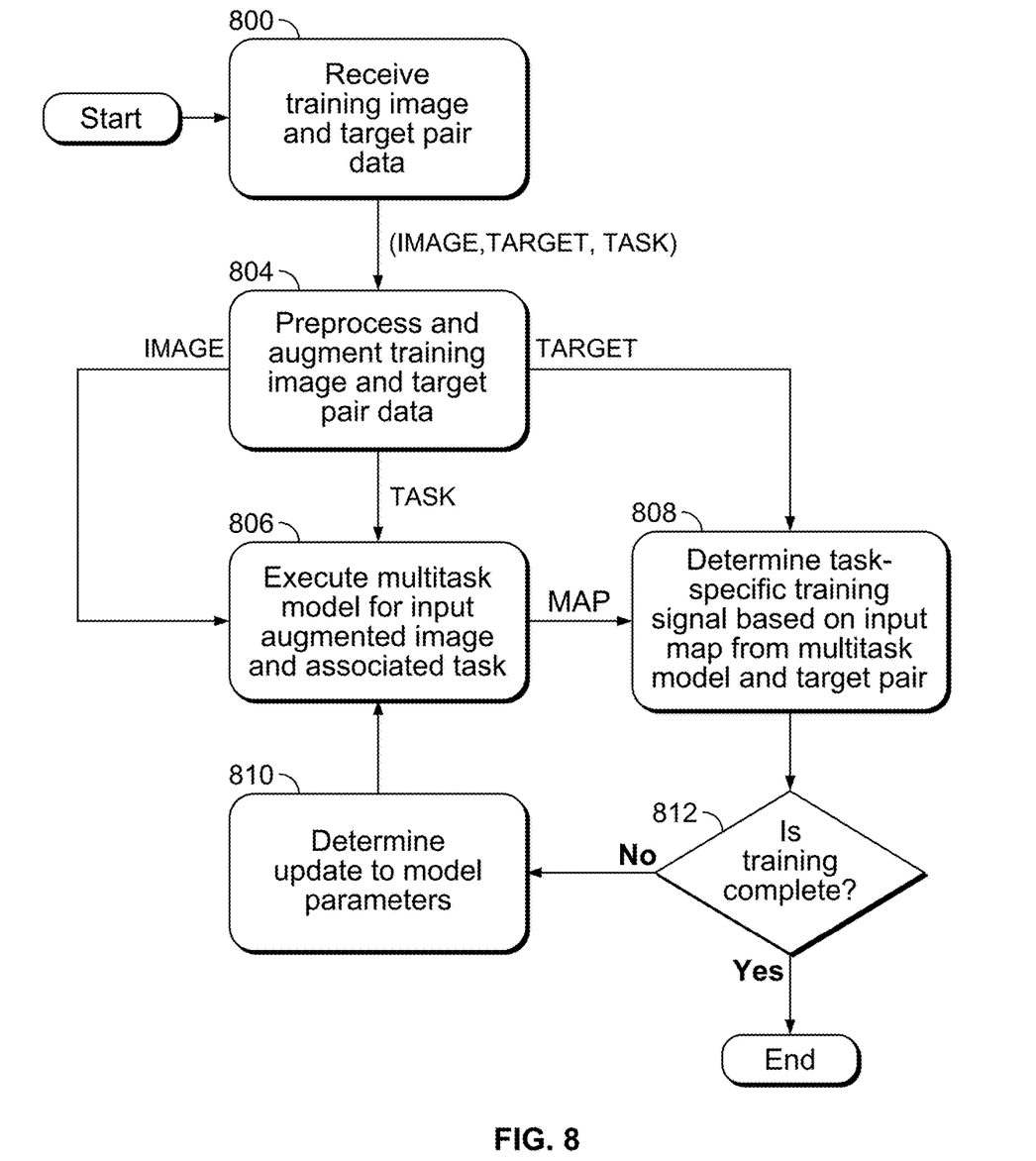
FIG. 8 is a flow diagram illustrating an embodiment of a system for training a multitask model.

FIG. 8 is a flow diagram illustrating an embodiment of a system for training a multitask model. In some embodiments, the flow diagram of FIG. 8 is implemented by multitask training system 122 of FIG. 1. In the example shown, in 800, training image and target pair data is received for a particular task type and control passes to 804. For example, the tuple (IMAGE, TARGET, TASK) comprises an image containing a stop sign, a corresponding target heatmap indicating the location of the stop sign in the image, and the task type of object identification. In 804, training image and target pair data is preprocessed and augmented to create a richer set of training data. For example, the augmentations of image and corresponding target heat map data includes horizontal flipping of data, cropping of data, changing contrast of data, changing brightness of data, changing saturation of data, changing hue of data, resizing of image data, cutting out image data, shifting image data vertically, and/or shifting image data horizontally.

In 806, multitask model for augmented image (IMAGE) and associated task (TASK) input is executed and output heatmap (MAP) is passed to 808. For example, multitask model processes an input image (IMAGE) containing a bicycle for the object location task (TASK) and outputs a heatmap (MAP) that indicates the probability of a bicycle for every pixel in the image. In 808, the task-specific training signal based on multitask model heatmap (MAP) and paired target heatmap (TARGET) is determined and control passes to 812. For example, the heatmap from the multitask model (MAP) is compared to the ground truth target heatmap (TARGET) to derive a training signal that indicates how well the multitask model predicted the location of the bicycle object. In 812, whether the training is complete is determined. If training is complete, the process ends. If training is not complete, control passes to 810. In 810, an update to multitask model parameters is determined and control passes to 806. For example, the training signal indicates a high error for the multitask model's prediction of the location of a bicycle in the image. As a result, the multitask model parameters are adjusted to lower the prediction error. In some embodiments, multitask model is implemented by NPU 311 and multitask model parameters are adjusted by model updater 316 of FIG. 3.

Figure 9:
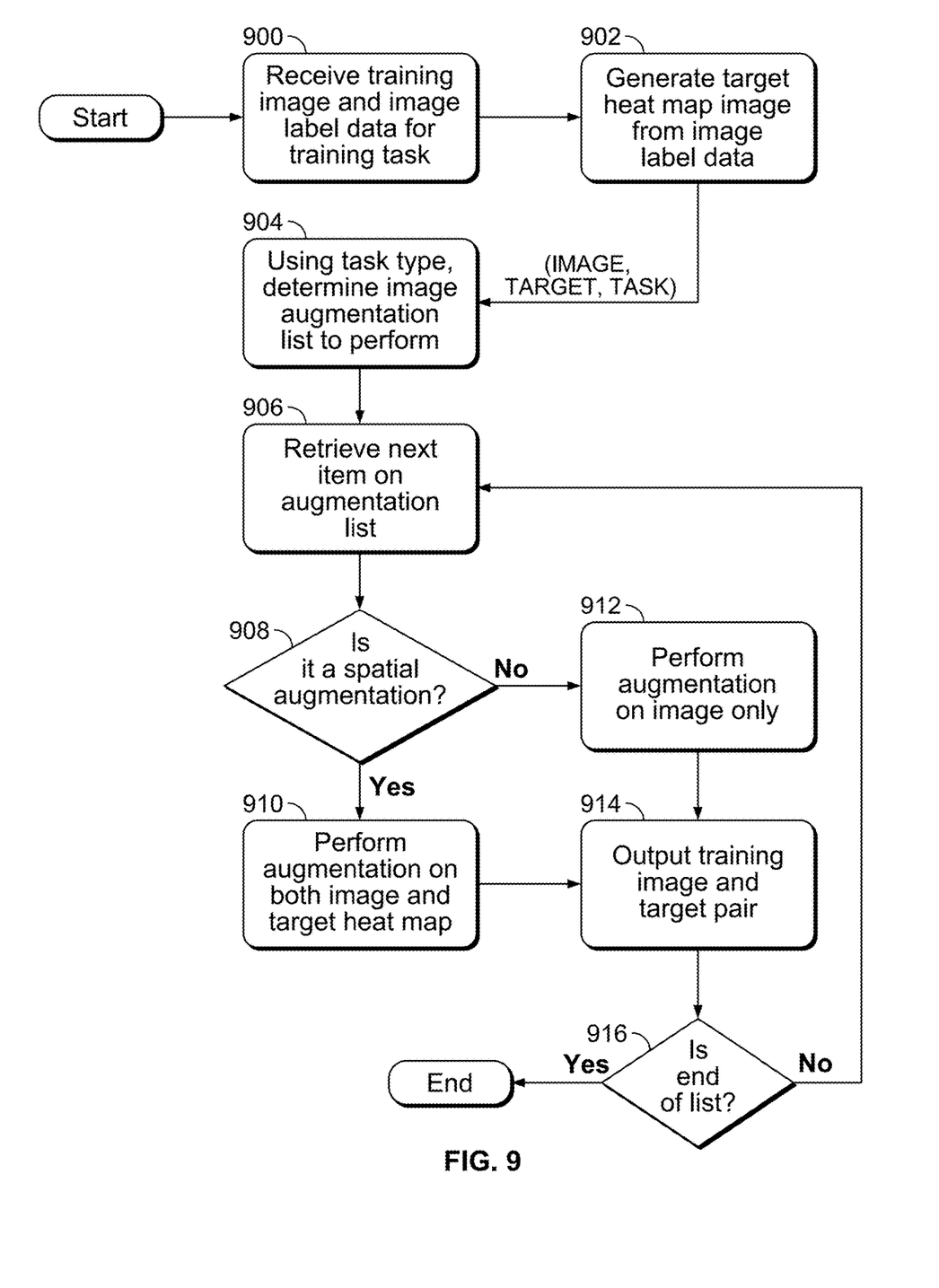
FIG. 9 is a flow diagram illustrating an embodiment of a system for preprocessing and augmenting training image and target pair data.

FIG. 9 is a flow diagram illustrating an embodiment of a system for preprocessing and augmenting training image and target pair data. In some embodiments, the flow diagram of FIG. 9 is implemented by block 804 of FIG. 8. In the example shown, in 900, training image and image label data for training task is received and control is passed to 902. For example, a training image (IMAGE) of a bicycle object has labels comprising the object center location, the object's bounding box, the scale of the object, the offset of the object, or any other appropriate label. In some embodiments, a training image containing a horizon has labels comprising coordinates of a line locating the horizon or any other appropriate label. In various embodiments, a training image containing lanes has labels comprising the lane locations, vertical and horizontal affinity fields, or any other appropriate label.

In 902, target heatmap image from image label data is generated and the tuple (IMAGE, TARGET, TASK) is sent to 904. For example, a target heatmap for an image containing an object task is generated by convolving a Gaussian centered at the object's center with a width proportional to the object's bounding box size.

In 904, a list of image augmentations to perform for a specified task type is determined and control is passed to 906. For example, a Boolean matrix with columns containing task types and rows containing image augmentation types is referenced to create a list of image augmentations to perform.

In 906, the next item from the list of image augmentations is retrieved and control is passed to 908. In 908, whether it is a spatial augmentation is determined. If the image augmentation is a spatial type of augmentation (e.g., cropping, scaling, cutout, flipping, rotating, padding, shifting, etc.), control is passed to 910. If the image augmentation is a pixel-only type of augmentation (e.g., contrast, brightness, hue, greyscale, etc.), control is passed to 912. In 910, an image augmentation specified by the item from the list of image augmentations is performed on both the image and the corresponding target heatmap and control is passed to 914. In 912, an image augmentation specified by the item from the list of image augmentations is performed on only the image (i.e., the corresponding target heatmap is left unchanged), and control is passed to 914. In 914, the training image and target heatmap pair is output and control is passed to 916. In 916, whether it is the end of the list of augmentations is determined. If not the end of the list, control is passed to 906 and the next item on the list is loaded for processing. If end of list, the process ends.

Figure 10:
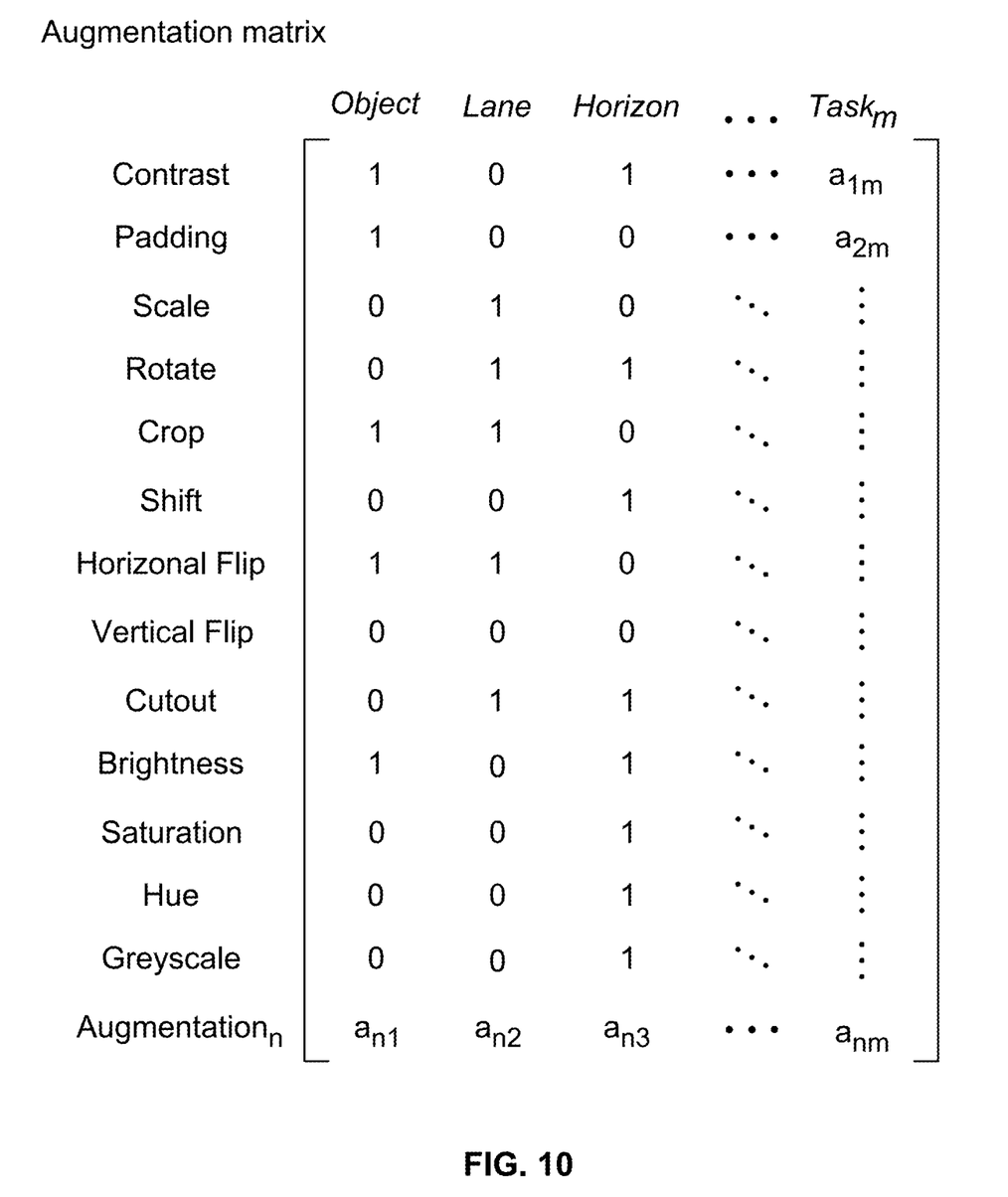
FIG. 10 is a Boolean matrix illustrating an embodiment of a matrix for specifying task-dependent types of image augmentations.

FIG. 10 is a Boolean matrix illustrating an embodiment of a matrix for specifying task-dependent types of image augmentations. In some embodiments, the Boolean matrix comprises columns containing task types (e.g., an object column, a lane column, a horizon column, and an mth task column) and rows containing image augmentation types (e.g., a contrast augmentation, a padding augmentation, a scale augmentation, a rotation augmentation, a crop augmentation, a shift augmentation, a horizontal flip augmentation, a vertical flip augmentation, a cutout augmentation, a brightness augmentation, a saturation augmentation, a hue augmentation, a grayscale augmentation, and an nth augmentation). For example, to generate a list of image augmentation types to generate for object tasks, the column for objects is selected, and for each row containing a 1 in the object column, the image augmentation type is added to the list of image augmentations to perform.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  a video event recorder, comprising:
    a camera; and
    a processor configured to:
      receive data from the camera using an input image interface;
      determine, using the data and a multitask model, a plurality of heat maps, wherein the multitask model is trained using preprocessed data, wherein the preprocessed data is related to one task and one heat map output, wherein determining the plurality of heat maps comprises determining a horizon heat map comprising horizon pixels; and provide the plurality of heat maps; and a memory coupled to the processor and configured to provide the processor with instructions.

2. The system of claim 1, wherein the data from the camera comprises video data.

3. The system of claim 1, wherein the data from the camera comprises image data.

4. The system of claim 1, wherein the horizon heat map is post processed by one or more of thresholding, determining a number of highest value points, fitting a line through a number of points, determining an angle of a horizon line as a horizon annotation, and/or determining an offset location of a horizon line as a horizon annotation.

5. The system of claim 1, wherein preprocessed data includes horizontal flipping of data, cropping of data, changing contrast of data, changing brightness of data, changing saturation of data, changing hue of data, resizing of image data, cutting out image data, shifting image data vertically, and/or shifting image data horizontally.

6. The system of claim 1, wherein the data from the camera is encoded by down sampling into an encoded tensor, and wherein the encoded tensor is decoded by up sampling into a decoded tensor.

7. The system of claim 1, further comprising an other processor for performing post processing of the plurality of heat maps.

8. The system of claim 1, further comprising a vehicle camera, wherein the processor is further configured to receive other data from the vehicle camera via a vehicle data bus interface, and wherein determining the plurality of heat maps uses the other data.

9. The system of claim 1, wherein the processor is further configured to determine driver assistance alerts using the plurality of heat maps.

10. The system of claim 1, wherein the multitask model determines an object heat map.

11. The system of claim 10, wherein the object heat map comprises one or more of: a vehicle object heat map, a pedestrian object heat map, a traffic light object heat map, a cyclist object heat map, a stop sign object heat map, an x object scale, a y object scale, an x object offset, and/or a y object offset.

12. The system of claim 10, wherein the object heat map is post processed to generate an object location and an object box.

13. The system of claim 1, wherein the multitask model determines a lane heat map.

14. The system of claim 13, wherein the lane heat map comprises one or more of: a lane location heat map, one or two vertical affinity fields for lanes, and/or a horizontal affinity filed for lanes.

15. The system of claim 14, wherein the lane heat map is post processed by one or more of thresholding the lane heat map to determine lane areas, determining a vector field as a lane annotation, determining a change in vector field direction, determining a vertical or a near vertical vector associated with a location in the lane heat map to cluster the lanes areas, determining a change in an image row of a vector field direction to identify a lane edge point, and/or fitting a cubic spline to sets of lane edge points as a lane annotation.

16. A method, comprising:

receiving, by a processor of a video event recorder, data from a camera of the video event recorder;

determining, using the data and a multitask model executing on the processor, a plurality of heat maps, wherein the multitask model is trained using preprocessed data, wherein the preprocessed data is related to one task and one heat map output, wherein determining the plurality of heat maps comprises determining a horizon heat map comprising horizon pixels; and providing the plurality of heat maps.

17. A computer program product embodied in a non-transitory computer readable medium and comprising computer instructions for:

receiving, by a processor of a video event recorder, data from a camera of the video event recorder;

determining, using the data and a multitask model executing on the processor, a plurality of heat maps, wherein the multitask model is trained using preprocessed data, wherein the preprocessed data is related to one task and one heat map output, wherein determining the plurality of heat maps comprises determining a horizon heat map comprising horizon pixels; and providing the plurality of heat maps.

18. A system, comprising:

a video event recorder, comprising:

a vehicle camera;

a camera; and a processor configured to:

receive data from the camera using an input image interface;

receive other data from the vehicle camera via a vehicle data bus interface;

determine, using the data, the other data, and a multitask model, a plurality of heat maps, wherein the multitask model is trained using preprocessed data related to one task and one heat map output; and provide the plurality of heat maps; and a memory coupled to the processor and configured to provide the processor with instructions.

19. The system of claim 18, wherein the processor is further configured to determine driver assistance alerts using the plurality of heat maps.

20. A method, comprising:

receiving, by a processor of a video event recorder, data from a camera of the video event recorder;

receiving other data from a vehicle camera via a vehicle data bus interface;

determining, using the data, the other data, and a multitask model executing on a processor, a plurality of heat maps, wherein the multitask model is trained using preprocessed data related to one task and one heat map output; and providing the plurality of heat maps.

21. A computer program product embodied in a non-transitory computer readable medium and comprising computer instructions for:

receiving, by a processor of a video event recorder, data from a camera of the video event recorder;

receiving other data from a vehicle camera via a vehicle data bus interface;

determining, using the data, the other data, and a multitask model executing on a processor, a plurality of heat maps, wherein the multitask model is trained using preprocessed data related to one task and one heat map output; and providing the plurality of heat maps.

* * * * *